April 28, 1925.
W. C. ROE
SOLDERING IRON
Original Filed March 14, 1919
1,535,498
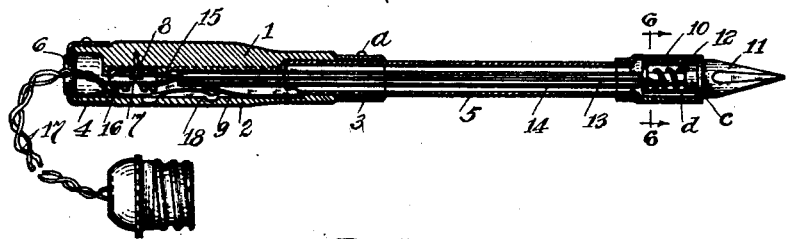
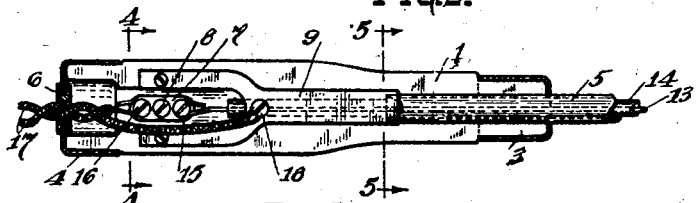
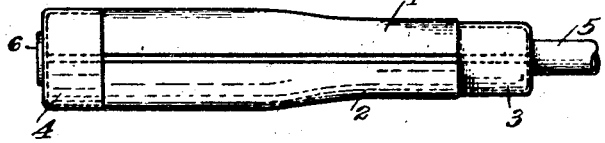
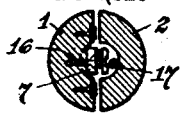 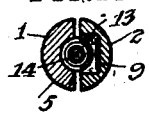 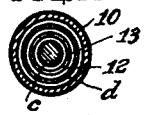

Patented Apr. 28, 1925.

1,535,498

UNITED STATES PATENT OFFICE.

WILLIAM CHARLES ROE, OF PITTSBURGH, PENNSYLVANIA.

SOLDERING IRON.

Application filed March 14, 1919, Serial No. 282,557. Renewed January 21, 1921. Serial No. 439,050.

*To all whom it may concern:*

Be it known that I, WILLIAM CHARLES ROE, a citizen of the United States, residing at Pittsburgh, in the county of Allegheny and State of Pennsylvania, have invented a new and useful Improvement in Soldering Irons, of which improvement the following is a specification.

My invention relates to improvements in soldering irons, and more especially to electrically heated irons.

It is an object of this invention to produce a device of this kind which can be heated quickly, and which will lose its heat even more quickly, and, moreover, to produce a device in which the electric current is conveyed to the heating element only when required by the provision of an electric switch contained in the handle of the iron, and which is easily manipulated by the operator when grasping the iron.

Another object of my invention is to produce a device of this kind, which is simple of construction, in which the parts are easily assembled, and which can be manufactured at a low cost.

Other objects of my invention and the invention itself will be made apparent by reference to the following description, in which reference is had to the drawings accompanying the same, and in which drawings,—

Figure 1 is a longitudinal central section.

Figure 2 is a plan view of the handle section to which the operative elements of the tool are attached.

Figure 3 is a plan view, the other handle section and the forward portion carrying the heating element being removed.

Figure 4 is a section on line 4—4 of Figure 2.

Figure 5 is a section on line 5—5 of Figure 2.

Figure 6 is a section on line 6—6 of Figure 1.

Referring to said drawings, 1 and 2 are respectively separable sections which with the ferrules 3 and 4 mounted at the ends of said sections constitute the handle of the device. The said sections are formed of any non-conducting material, preferably of wood, and are recessed or hollowed out interiorly for the reception of the means for transmitting electric current to the operative end of the device, and for the reception of one end of the metallic tube 5 which is securely attached to section 1 by means of the screw, *a*, and constitutes a part of the conductor to carry current to the heating element, the opposite end of said section being secured to the ferrule 3. The said section 2 is loosely or movably mounted between said ferrules, a space being formed between the inner surface of the end thereof seated in the ferrule 3 and the end of said tube 5 and the inner surface of the end seated in ferrule 4, and the insulated thimble 6 secured between said sections at the outer end thereof, and is capable of being forced against the adjacent edges of section 1 by compression as when grasped by the hand of the user. The means for transmitting electric current to the device comprises a contact plate 7 secured in the recess formed in section 1 by screws 8 or other suitable manner, and a switch or flexible contact blade 9, one end of which is bifurcated and secured in the recess in section 1 in a similar manner to contact plate 7. The said blade 9 projects forward towards the outer end of the tool, and upwardly so that the extreme end thereof engages against section 2, the tension of the blade holding the said section out of contact with section 1 as shown in Figure 3. The end of said tube 5 opposite to that secured in the handle sections is screw threaded and secured to the correspondingly screw threaded cylindrical member 10 in the outer end of which the soldering iron 11 is secured in any suitable manner. The inner end of said iron 11 comprises a short shank or shaft, *c*, upon which the resistance coil 12 inserted in one section of the return wire 13 is mounted, one end of said section of return wire being attached to the iron, and the opposite end extending through the glass tube 14 seated in the tube 5, to the binding post 15 on the plate 7. One end of the outer extension of the return wire is connected to said plate 7 by the binding post 16. Electric current is carried to said device through conductors 17, one end of which is secured to the blade switch 9 by means of the binding post 18 carried thereon. When the device is not in use the circuit is open, but when grasped by the user section 2 of the handle moves towards section 1, the inner surface of said section 2 engaging against and compressing the blade contact 9, forcing the said blade into contact with the inner end of tube 5, the end of said tube being slightly cut out to form a space therebetween and the end of said blade 9 as shown in Figure 1. The electric current is then carried from a source of supply through the conductor 17 secured to the blade switch 9 by means of the binding post, 18 through said switch to and through the tube 5 through the member 10 to the soldering iron 11, to the resistance 12 which is enclosed or surrounded by mica, $d$, through the return wires 13 and plate 8 to the extension of the return wire to the source of supply. The resistance of the heating element may be so proportioned as to heat the iron in about one minute with a current of 3.5 volts and 7 amperes, the said current being sufficient to bring the soldering iron to an operative heat. Other values of voltage and current may obviously be used, but I consider it important to so proportion the voltage and current values that the wattage consumed by the iron will be approximately 24-5/10 watts, although this value might be varied somewhat and still secure the result sought, which is that of providing sufficient heat to heat the tip 11 of the iron to a soldering temperature in a reasonable length of time, such as one minute, and to so construct the tip, as regards its mass and heat dissipating area, that it will cool most rapidly below the critical temperature at which articles of cotton, silk, wool and like materials would be ignited. Of course, it will be obvious that if the current continued to pass through the iron when the tip was brought into contact with such articles as above mentioned, ignition would soon ensue, but by the provision of the electric switch 9—5, which opens the circuit of the heating element whenever the iron is released by the operator, and by the provision of a heating element of small mass, and with an ability to rapidly dissipate heat, the operator can not inadvertently cause a fire by releasing the iron and laying it down, even when the tip comes into contact with textile materials, as above mentioned. This makes the iron of my invention of especial use in telephone central stations, where it may be employed to solder wires, which are insulated with textile materials, to multiple contacts and the like, although my iron is not limited to such use. Immediately the user releases pressure upon the handle the resiliency of blade contact 9 instantly disengages the end thereof from the tube 5, opening the circuit and automatically cutting out current to the device. Some of the advantages of the device are the saving of electric current and the avoidance of danger from fire and damage to property that may be occasioned by neglect to cut off current to a device of this kind when not in use.

Having described my invention what I claim and desire to secure by Letters Patent is:

1. An electrically heated soldering iron comprising a handle formed of interiorly recessed separable sections, a metallic tube rigidly connected to one of said sections, the other handle section being movably associated with said first mentioned section and said tube, a heating element comprising a soldering iron and a resistance coil in the electric circuit, means to convey electric current to said device, and a resilient switch secured in the handle section connected to the tube, the free end of said switch being normally out of contact with said tube and adapted to be forced into engagement therewith by the movement of the movable section of the handle when grasped by the user, whereby electric current is transmitted to said heating element only when in use.

2. An electrically heated soldering iron, comprising a heating element, a soldering tip, a rearwardly extending shank portion of the type adapted to contact with the said heating element and to transmit heat from the said element to the soldering end thereof, the shank portion constituting a minor portion of the tip, the major portion of the tip being exposed to the air to radiate heat freely thereto, a handle, an electric switch, said switch controlling said element and being located in the said handle and adapted to be operable when the said handle is grasped, said heating element being adapted to heat the said tip to soldering temperature when said switch is operated by the said handle, said tip and element being of such small mass and having a radiating surface of considerable area, so as to cool to a temperature below that which would ignite textile materials within the period required to ignite the said materials by the heat supplied by the cooling tip when said switch is operated to disable the said heating element.

3. An electrically heated soldering iron, comprising a handle, a switch in the handle, a tip, a rearwardly extending shank portion of the type adapted to contact with the said heating element and to transmit heat from the said element to the soldering end thereof, the shank portion constituting a minor portion of the tip, the major portion of the tip being exposed to the air to radiate heat freely thereto, a heating element adjacent the said tip and element, said heating element being adapted to be operated to soldering temperature with a current expenditure of less than thirty watts, said tip being so proportioned as to cool so rapidly when its heating element is de-energized as to fail to ignite textile materials when placed in contact therewith immediately after de-energizing the said element.

4. In an electric soldering iron, the combination with a heating element, a handle, an electric switch in the handle, means operative when the handle is grasped by the user to operate the said switch to close a pair of switch contacts in the circuit of the said element, said means being operative to open said circuit when the said handle is released, a soldering tip adapted to be heated by the said element, a rearwardly extending shank portion of the type adapted to contact with the said heating element and to transmit heat from the said element to the soldering end thereof, the shank portion constituting a minor portion of the tip, the major portion of the tip being exposed to the air to radiate heat freely thereto, the resistance of the said element and the thermal properties of the said tip being so proportioned that the said tip will cool from soldering temperature to a temperature below that which would ignite textile materials within the time required to ignite the said materials by the heat supplied by the cooling tip.

5. In an electric soldering iron, the combination with a heating element, a handle, an electric switch carried by the handle, said switch having a set of normally open contacts, means to close said contacts, said contacts being in the circuit of the said element, means to automatically reopen said circuit when the handle is released, a soldering tip in close thermal connection with the said element, a rearwardly extending shank portion of the type adapted to contact with the said heating element and to transmit heat from the said element to the soldering end thereof, the shank portion constituting a minor portion of the tip, the major portion of the tip being exposed to the air to radiate heat freely thereto, said element and tip being of such small mass and of such material as to have a relatively low heat storage capacity, and of such form as to have a relatively high heat radiation capacity to cause said tip to cool from a soldering temperature to a temperature below that required to ignite textile materials within the time required to ignite such materials by the heat supplied by the cooling tip when said circuit is automatically reopened.

6. In a soldering iron, a handle therefor, an electrical conducting heating element, a soldering tip, said tip having a soldering end, said element being in close thermal connection with and communicating heat to the tip, said soldering end comprising the major portion of the mass of the combined element and tip, a switch having normally open contacts in the circuit of the said element, means to close the said contacts, and automatic means to reopen the contacts when the soldering iron handle is released by the user.

7. In an electrical soldering iron, a soldering tip having low heat storage capacity and high heat radiation capacity, a handle, a switch having normally open contacts carried by said handle, an electrical heating element in close thermal relation to the said tip, means to close said contacts to admit electric current to the element to heat said element and tip to soldering temperature, means to automatically reopen said contact upon release of the handle by a user, the values of tip heat storage and radiation capacity being so related that upon said handle being released and the tip immediately brought into contact with textile materials, the temperature of the tip will be so rapidly reduced from soldering temperature that said materials will not be burned.

8. In an electrical soldering iron, a soldering tip having low heat storage capacity and high heat radiation capacity, a handle, a switch having normally open contacts, an electrical heating element in close thermal relation to the said tip, means to close said contacts to admit electric current to the element to heat said element and tip to soldering temperature, means to automatically reopen said contacts upon release of the handle by a user, the values of tip heat storage and radiation capacity being so related that upon said handle being released and the tip immediately brought into contact with textile materials the temperature of the tip will be so rapidly reduced from soldering temperature that said materials will not be burned.

9. In an electrically heated soldering iron, the combination with a soldering tip, a handle for supporting said tip, a heating element carried by the tip, said heating element having a very low heat storage capacity relative to the body of the tip and connecting means for the said handle and tip arranged to prevent the flow of a substantial quantity of the heat from the tip toward the handle.

10. In an electrically heated soldering iron, the combination with a soldering tip, a handle for supporting said tip, a heating element carried by the tip, said heating element having a very low heat storage capacity relative to the body of the tip and connecting means for the said handle and tip arranged to prevent the flow of a substantial quantity of the heat from the tip toward the handle, the soldering end of the soldering iron disposed forwardly of the handle being of approximately no greater diameter than the largest diameter of the soldering tip.

11. In an electric soldering iron, the combination with a heating element, a handle, an electric switch, said switch having a set of normally open contacts, means to close said contacts, said contacts being in the circuit of the said element, means to automatically reopen said circuit when the handle is released, a soldering tip in close thermal connection with the said element, said element and tip being of such small mass and of such material as to have a relatively low heat storage capacity, and of such form as to have a relatively high heat radiation capacity to cause said tip to cool from a soldering temperature to a temperature below that required to ignite textile materials within the time required to ignite such materials by the heat supplied by the cooling tip when said circuit is automatically reopened.

In testimony whereof, I have hereunto signed my name in the presence of two subscribing witnesses.

WILLIAM CHARLES ROE.

In the presence of—
ALEX. I. MABON,
JOHN H. RONEY.